United States Patent [19]

Sekine et al.

[11] Patent Number: 5,193,608

[45] Date of Patent: Mar. 16, 1993

[54] RADIATOR WITH FAN FOR MOTOR VEHICLES

[75] Inventors: Yoshikazu Sekine, Hadano; Tadashi Mizuno, Niiza, both of Japan

[73] Assignee: Toyo Radiator co., Ltd., Tokyo, Japan

[21] Appl. No.: 857,342

[22] Filed: Mar. 25, 1992

[51] Int. Cl.⁵ .......................... F01P 7/02; F28F 9/00; B60K 11/08

[52] U.S. Cl. ........................................ 165/41; 165/44; 165/51; 123/41.49; 180/68.1; 180/68.4; 416/169 A; 416/223 R

[58] Field of Search .............................. 165/41, 44, 51; 123/41.49; 180/68.1, 68.4; 416/169 A, 223 R

[56] References Cited

U.S. PATENT DOCUMENTS

| 3,635,285 | 1/1972 | Davis | 165/51 |
|---|---|---|---|
| 3,727,593 | 4/1973 | Enke | 123/41.49 |
| 3,933,136 | 1/1976 | Burst | 165/51 |
| 4,111,275 | 9/1978 | Masuda et al. | 62/244 |

FOREIGN PATENT DOCUMENTS

| 1174922 | 9/1984 | Canada | 123/41.11 |
|---|---|---|---|
| 0191012 | 8/1986 | European Pat. Off. | 165/41 |
| 3304296 | 9/1983 | Fed. Rep. of Germany | 123/41.49 |
| 3432439 | 8/1985 | Fed. Rep. of Germany | 123/41.49 |
| 2657825 | 8/1991 | France | 180/68.4 |
| 0085316 | 5/1983 | Japan | 123/41.49 |
| 0176499 | 10/1984 | Japan | 416/169 A |
| 0078827 | 5/1985 | Japan | 165/51 |
| 1584765 | 2/1981 | United Kingdom | 123/41.49 |

OTHER PUBLICATIONS

"Mixed-flow fan halves power absorption" Automotive Engineering May 1981 vol. 89, No. 5 pp. 70-71.

Primary Examiner—John K. Ford
Attorney, Agent, or Firm—Sughrue, Mion, Zinn, Macpeak & Seas

[57] ABSTRACT

A radiator with a fan is arranged at a forward tilt under the footrest floor part of a cab floor of a cab-over-engine vehicle. The fan confronts the front of the engine. The fan is connected with the radiator through an air duct, a central axis of the air duct rises rearwardly. The fan has at its center a boss shaped into a truncated cone, the extremity of each of the blades in its longitudinal direction being parallel to the axis of the boss. The air duct has one opening end shaped into a cylinder which partially covers the blades of the fan.

4 Claims, 7 Drawing Sheets

Diagonal flow

FIG. 7

Effect of covering ratio of fan shroud ( ⓓ 20° )

FIG. 8

Shapes of test blades

FIG. 9

Effects of cone angle. Blade ⓓ

FIG. 10 Effects of cone angle, Blade Ⓑ

FIG. 11 Effects of cone angle, Blade Ⓒ

FIG. 12

Comparison of optimum cone angles of Ⓓ Ⓑ and Ⓒ

RADIATOR WITH FAN FOR MOTOR VEHICLES

BACKGROUND OF THE INVENTION

1. Field of the Invention

The present invention generally relates to a radiator with a fan to be used for cab-over-engine vehicles and which is widely employed in trucks or the like, and more particularly, is directed to a radiator with a fan capable of improving air flow effect, increasing heat exchanger effectiveness, and reducing size.

2. Description of the Related Art

Cab-over-engine vehicles such as trucks have an engine under a cab seat of the cab floor, the top front of the engine facing a wall surface through a small space. The space accommodates a radiator for cooling engine cooling water, and includes a blowing fan. The blowing fan generates an air flow in the direction parallel to its rotating shaft which is linked with a rotating shaft of the engine through a belt or the like.

In such cab-over-engine vehicles, the space for mounting the radiator and the fan is extremely small, and there are a multiplicity of obstacles in the air flow passages passing through the radiator. Thus the air flow effect of the radiator core and the heat exchanger effectiveness per unit area of the radiator core are poor. Also, a hot air is disadvantageously liable to remain on the underside of the cab floor or over the top outer periphery of the engine.

SUMMARY OF THE INVENTION

It is therefore an object of the present invention to overcome the disadvantages with respect to the conventional radiator as described above, and to provide a radiator with a fan in which the air flow effect of the radiator in a cab-over-engine vehicles is improved, the heat exchanger effectiveness per unit area of the radiator being increased, and the hot air existing on the underside of the cab floor being smoothly discharged.

It is another object of the present invention to provide a fan which is most suitable for such radiators and to provide optimum conditions for the interrelationship of the fan, the radiator and the duct.

The above objects of the present invention can be accomplished with respect to a cab-over-engine vehicle by employing a radiator having a fan wherein the radiator is arranged at a forward tilt under a footrest floor part, an air duct has a central line which rises backward and includes one end with a first opening linked with the outer periphery of the back of a radiator core, and another end with a second opening facing the front of the engine, and the fan is provided within the second opening of the air duct for generating air flow from the front of the radiator core toward the back thereof.

The fan also includes at its center, a truncated cone shaped boss and further includes a plurality of blades each having the same length fastened at their roots to the outer periphery of the boss, the extremity of each of the blades in the longitudinal direction being formed parallel to the rotating shaft of the boss.

Furthermore the second opening at the other end of the air duct includes a short cylindrical part slightly separated from the extremity of each of the blades in the longitudinal direction and parallel to the extremity, the opening edge of the cylindrical part partially covering the blades with only the trailing edges of the blades in the width direction being exposed.

Other objects, features, and advantages of the present invention will become more apparent based on the detailed description of the present invention with reference to the accompanying drawings.

DETAILED DESCRIPTION OF THE PREFERRED EMBODIMENTS

Figure 1:
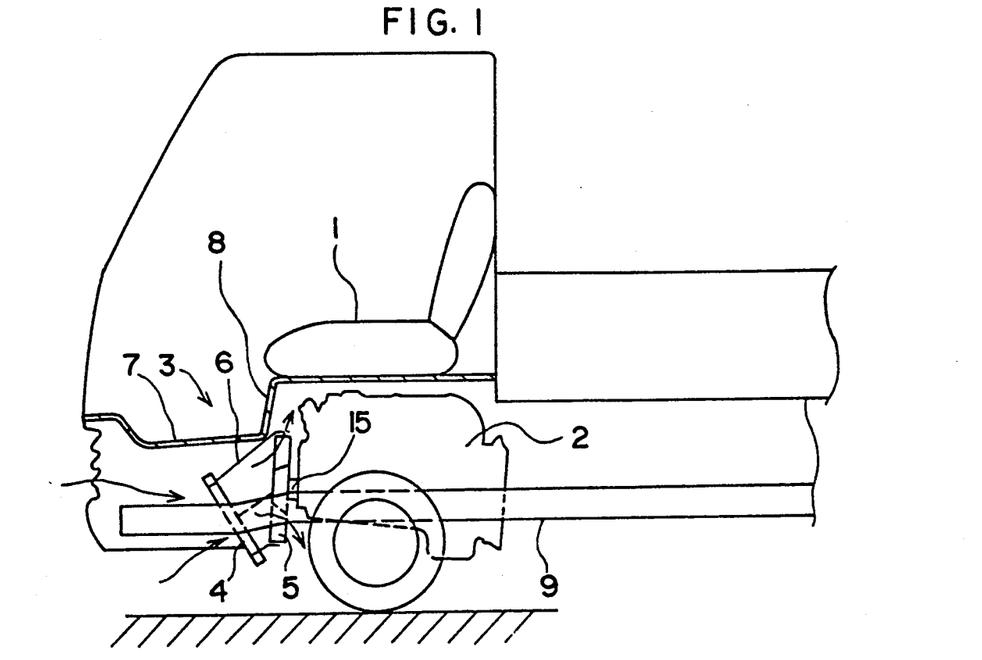
FIG. 1 is an explanatory drawing showing a radiator with a fan in accordance with the present invention, which is incorporated in a cab-over-engine truck.

As shown in FIG. 1, a vehicular radiator with a fan according to the present invention is designed to be mounted on cab-over-engine vehicles. The cab-over-engine vehicle of this embodiment comprises a cab floor 3 including a supporting surface for supporting a cab seat 1 and a recessed footrest floor part 7 in front of the support surface, which are stepwise formed through a wall 8. An engine 2 is disposed under the cab seat 1, and the top front of the engine 2 is relatively close to the wall 8. The engine 2 is supported on a frame 9 at the bottom of the vehicle.

A radiator 4 below the footrest floor part 7 is supported on a mounting frame (not shown) connected to the frame 9 and is tilted forward. The radiator 4 comprises a core which, by way of example, includes a multiplicity of flat tubes (not shown) and corrugated fins (not shown) interposed between the flat tubes, both ends of each of the tubes being communicated with a pair of tanks. The core of the radiator 4 is of a flat rectangular shape, and a first opening of an air duct 6 is connected to the periphery of the back of the radiator 4. The air duct 6 includes on the radiator 4 side the first opening having a rectangular shape, and includes on the side of a fan 5, described later, a second opening having a circular shape. The fan 5 is mounted on a rotating shaft 15 either directly linked with a crankshaft not shown of the engine 2 or through a belt linked with the crankshaft. The fan 5 is arranged within the second opening of the air duct 6. Between the rotating shaft 15 and the fan 5 there is commonly interposed a fan clutch 14 as shown in FIG. 2.

Figure 2:
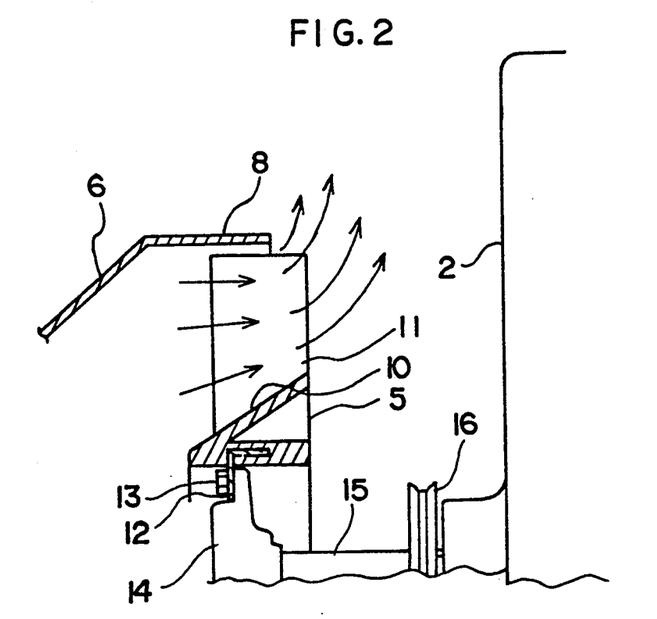
FIG. 2 is a schematic sectional view showing partially a fan and an air duct to be used in the present invention.

Referring now to FIG. 2, the fan 5 comprises a boss 10 including a periphery shaped into a truncated cone, the periphery being provided with a multiplicity of fan blades 11 each having the same shape radially and integrally formed thereon. The fan 5 is rotated to lead an air flow diagonally backward from the front side to the rear side and simultaneously in a radial direction. The fan employed in this embodiment is molded from a synthetic resin, with the boss 10 having an inner periphery shaped into a short cylinder into which a metallic flange 12 is partially immersed. Moreover, through bolt holes 20 (FIG. 5) provided in the flange 12, bolts 13 are fastened to a casing of the fan clutch 14 as shown in FIG. 2. The rotating shaft 15 of the fan clutch 14 is supported on the front of the engine 2. In this embodiment, a belt pulley 16 is attached to the rotating shaft 15 so that rotational movement of the crankshaft is transmitted to the rotating shaft 15 through a belt (not shown). On one end of the rotating shaft 15 there is fitted a rotating plate (not shown) which is introduced in the casing of the fan clutch 14. The rotating plate (not shown) is detachably liked with the casing through an oil depending on changes in temperature of the periphery of the clutch.

Figure 3:
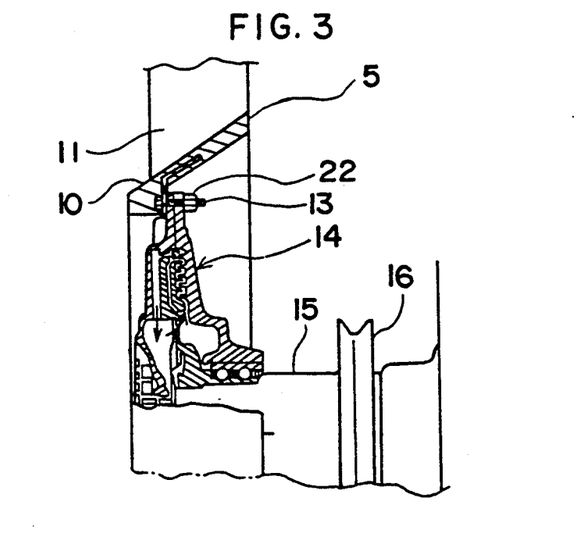
FIG. 3 is a fragmentally sectional view showing another structure in which a fan clutch is attached to a boss of the fan.

FIG. 3 shows another embodiment of the structure in which the fan clutch 14 is attached to the boss 10 of the fan, in which the bolt 13, previously partially secured to the back of the boss 10, is fastened to the casing of the fan clutch 14 through a nut 22. This embodiment allows the peripheral edge of the casing of the fan clutch 14 to be located closer to the outer periphery of the boss 10, which lessens the diameter of the boss 10 as compared with that in FIG. 2, thus contributing to the reduction in size of the fan.

Figure 4:
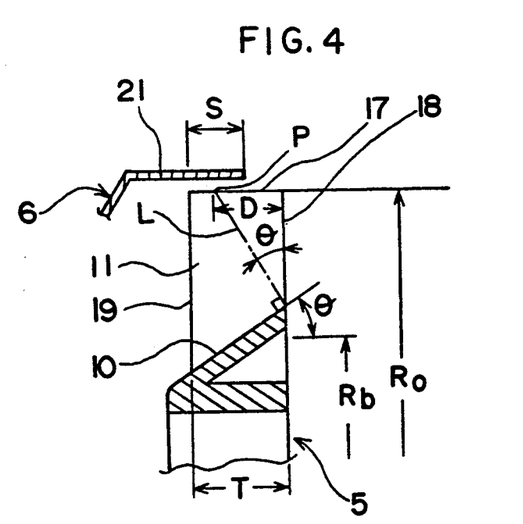
FIG. 4 is an explanatory drawing showing a dimensional relationship between the fan and the air duct employed in the present invention.
Figure 5:
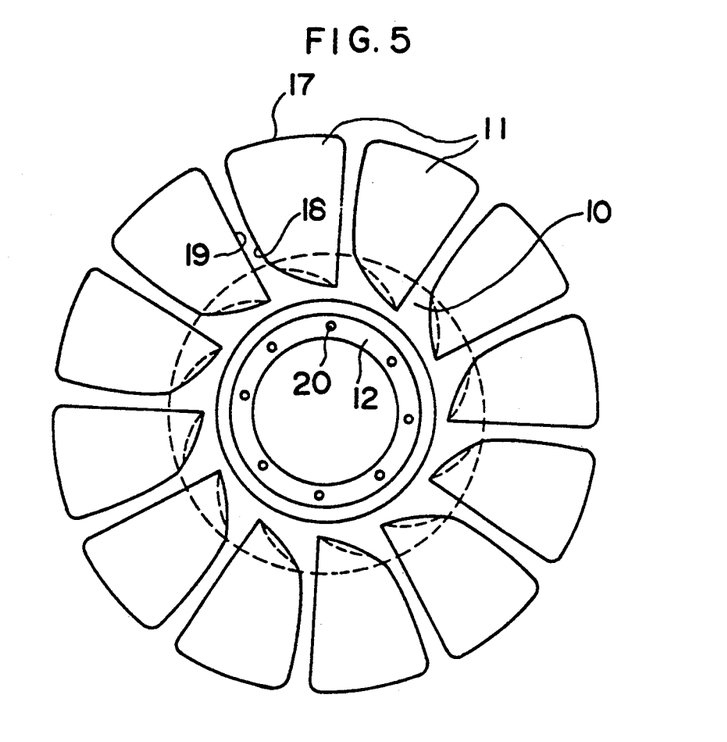
FIG. 5 is a front view of the fan used in the radiator with a fan of the present invention.

Referring next to FIG. 5, the fan 5 has a diameter substantially double the typical diameter of the boss 10 thereof. This will now be detailed with reference to FIG. 4. The relationship between a radius R0 from the central axis of the boss to the extremity of the blade 11 in the longitudinal direction, and a radius Rb from the axis to the outer periphery of the boss 10 at the midpoint of the blade 11 in its width direction is substantially expressed by the equation $$R_b/R_o = 0.45 \text{ to } 0.55.$$

It is also preferable that the angle $\theta$ of inclination of the boss 10 be about 20 to 35.5 degrees. It is further preferred that the relationship between a distance D from a point P of the blade 11 to the trailing edge 18 of the blade 11, and a width of the blade 11 is expressed as $D/T = 0.65$ to $1.0$ (FIG. 4). The point P of the blade 11 represents a point of intersection between an imaginary line L and the extremity of the blade 11 in its longitudinal direction, where the imaginary line extends normal to the outer surface of the boss 10 at the intersection of the boss 10 and the trailing edge 18 of the blade 11 in its width direction.

The second opening of the air duct 6 facing the engine includes a cylindrical part 21 coaxially with the boss as clearly shown in FIG. 4. The cylindrical part 21 covers the blades 11 of the fan 5 by a distance S, with the trailing edges of the blades 11 in the width direction thereof being exposed from the cylindrical part 21. The cylindrical part 21 is designed to partially cover the width T of the blade 11 by a distance S, the relationship between T and S being expressed as $S/T = 0.5$ to $0.7$.

It is most preferable for the thus configured fan 5 to be operated with its pressure coefficient lying within the range of 0.25 to 0.35. In other words, it is most preferable to design the fan such that points of intersection between a pressure coefficient curve of the fan used in this invention and pressure coefficient curves of the radiator and the duct used in this invention lie within the range of 0.25 to 0.35 in pressure coefficient, where the abscissa represents a volumetric coefficient and the ordinate represents a pressure coefficient.

At the top and bottom ends of the core of the radiator 4 there are arranged tanks, respectively, provided with a cooling water transfer pipe (not shown). The pipe is communicated with a water jacket (not shown) of the engine 2 by way of a flexible hose.

According to experiments performed by the inventors, it has been proved in a cab-over-engine truck that the radiator with a fan of the present invention is improved in radiating performance by 30% as compared with the conventional radiator with a fan. In addition, the air flow resistance of the radiator core is reduced by one third to remarkably improve the radiating performance of the entire engine room. Also, the improvement in intake effect of the fan enables the number of revolutions of the fan to be reduced, which results in the reduction of noise arising from the rotation of the fan.

Figure 6:
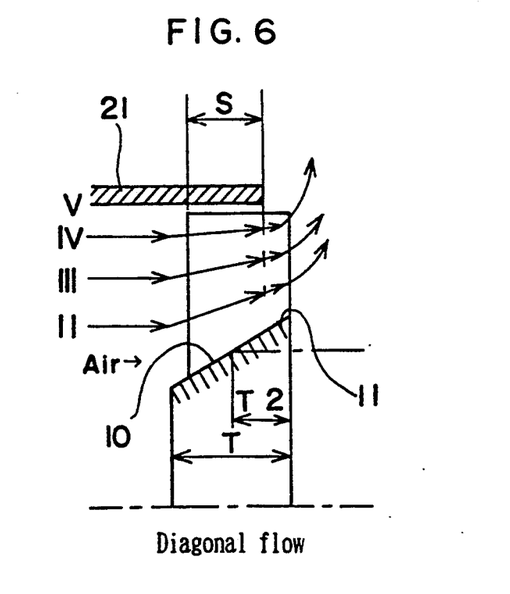
FIG. 6 is an explanatory view of air flow passing between the boss of the fan and the air duct used in the present invention.

Such improvement in the radiating performance of the radiator is probably the result of the following. First, the radiator 4 is forward tilted within a relatively large space below the footrest floor part 7 of the cab floor so as to smoothly take in air from the front of the radiator. Accordingly, the air which has passed through the tilted radiator core is smoothly led diagonally upward through the air duct substantially without changing the direction of the air flow. The air flow is then led diagonally backward in the radial direction through the fan 5 having the truncated cone-shaped boss. This makes it possible to smoothly lead along the outer surface of the engine the air flow which has passed through the fan. FIGS. 2 and 6 show the air flow in the fan and in the vicinity thereof, in which the air flow is first introduced in between the truncated cone-shaped boss 10 of the fan and the cylindrical part 21 of the air duct. The cross section of the space confined by the cylindrical part 21 and the boss 10 is diminished as cooling air flows downstream. This structure allows the air flow led by the multiplicity of blades 11 to be gradually accelerated. The air flow can be smoothly led in the radial direction since the cylindrical part 21 is open at the downstream end of the blades 11 in the direction of flow of the air, thus improving the air flow effect.

FIGS. 7 to 12 show characteristic curves representing the test results, under optimum conditions, of the fan employed in the present invention. The following is a description of the performance test.

Figure 8:
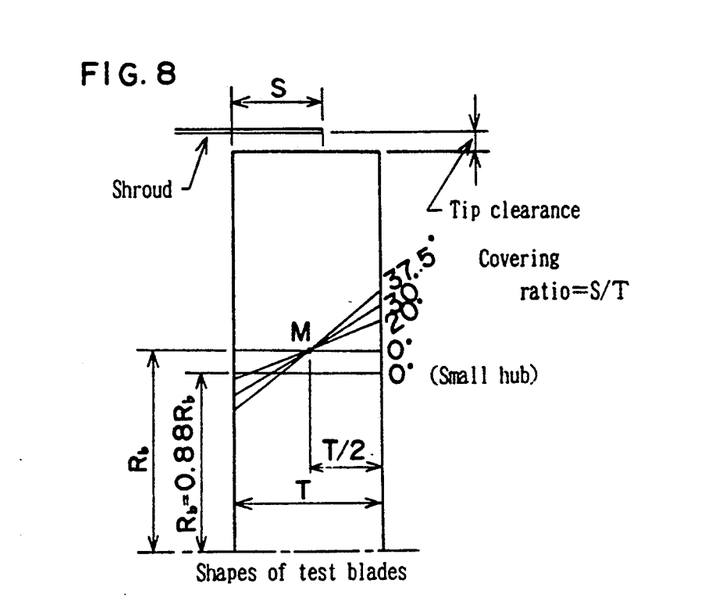
FIG. 8 is an explanatory drawing of samples prepared to experimentally find the optimum conditions for the angle of slope of the boss of the fan used in the present invention.

TEST FANS—Performance tests were carried out for the fans with dimensions as shown in Table 1. To simplify design of the test fans, the conical angles of boss or hub sections are determined by lines through the middle point "M" of projected width "T" as shown in FIG. 8. The blade aerofoil sections are the same for all test fans except the hub section.

TABLE 1

| Fan | Dimensions of Test Blades | | | Cone Angle | | | | |
|---|---|---|---|---|---|---|---|---|
| | Dia. (mm) | Width (mm) | Dia/Width | 0° | 0° | 20° | 30° | 37.5° |
| D | 430 | 85 | 0.1977 | ○ | ○ | ○ | ○ | ○ |
| B | 480 | 79 | 0.1646 | ○ | ○ | ○ | ○ | ○ |
| C | 425 | 49 | 0.1153 | ○ | | | ○ | |

TEST METHOD—Characteristic tests were conducted by the chamber method using a large wind tunnel. The standard tip clearance of blade is 5 mm and the fan speed is 3000 rpm.

Covering Ratio of Fan Shroud—The covering ratio of the shroud to the projected blade width was set for 35%, 50%, 70% or 85%.

Performance—Characteristic tests were made for the fan static pressure, the efficiency and the shaft power under the fan speed of 2500, 3000 and 3500 rpm for D and C, and 2000, 2500 and 3000 rpm for B.

Flow Visualization—Flow conditions at the outlet of blade were observed by the tuft method for various working points from the large flow rate to the stall point.

Fan Noise—Fan noise near the design point was measured at the point of 2 m laterally apart from the fan outlet at 2500 and 3000 rpm.

Dimensionless Coefficients—The following dimensionless coefficients were used for the comparison of test results.

$$\text{Flow coefficient: } \phi = \frac{Q}{A \cdot U}$$

$$\text{Pressure coefficient: } \psi = \frac{P}{(\frac{1}{2}) \rho U^2}$$

$$\text{Power coefficient: } \lambda = \frac{L}{A \cdot (\frac{1}{2}) \rho U^3} = \frac{\phi \psi}{\eta}$$

where

Q: flow rate [m³/s]

$A = \pi R_0^2 (1 - \gamma^2)$

: flow sectional area at point M (hub ratio γ in FIG. 8) [m²]
u: peripheral speed of blade [m/s]
p: fan static pressure [Pa]
ρ: air density [Kg/m³]
L: shaft power of fan [N·m/s]

TEST RESULTS

Figure 7:
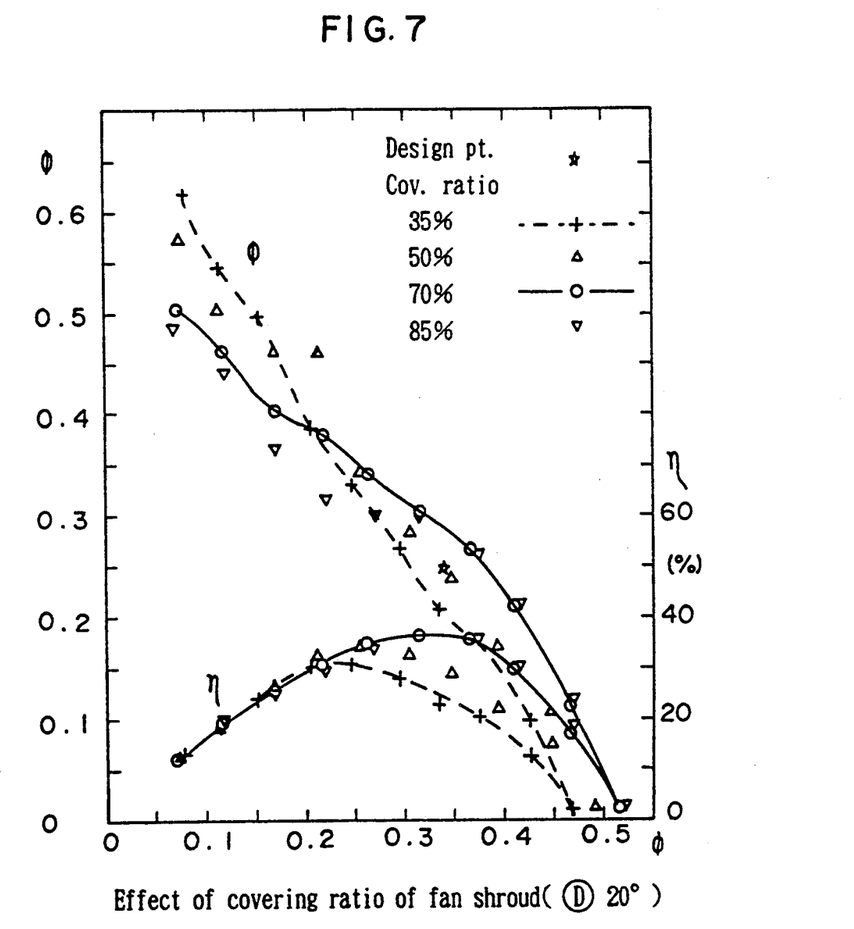
FIG. 7 shows a characteristic curve representing experimentally, the relationship between the fan performance and the ratio of the blade covered by an end of the air duct in the radiator with a fan according to the present invention.

Covering Ratio of Fan Shroud—Characteristics obtained from the tests are shown in FIG. 7, with various covering ratios of shroud to the blade projected width as parameters. The best results were obtained at the covering ratio of 70% near the design point of all the tested fans.

Figure 9:
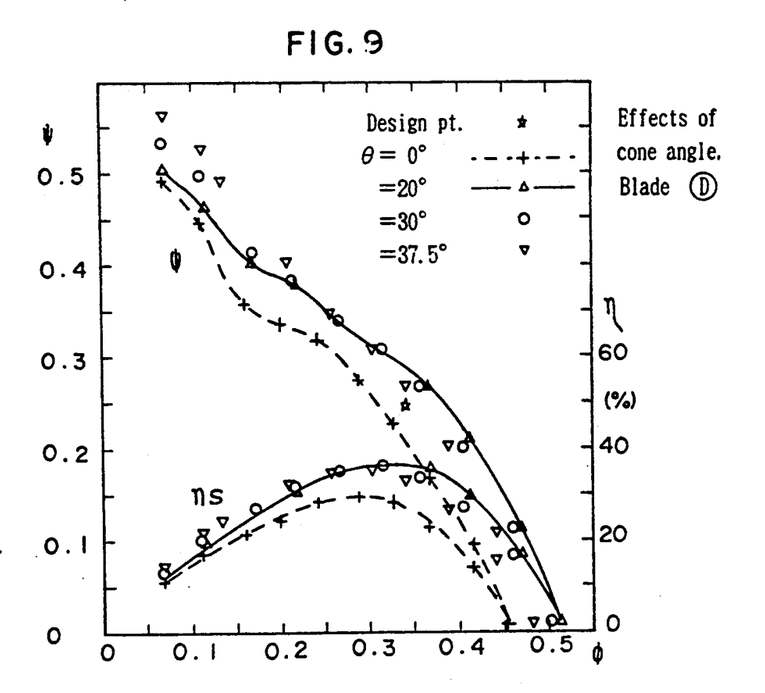
FIG. 9 shows a characteristic curve representing, experimentally the relationship between the fan performance and the angle of slope of the boss of a first fan to be used in the present invention.
Figure 10:
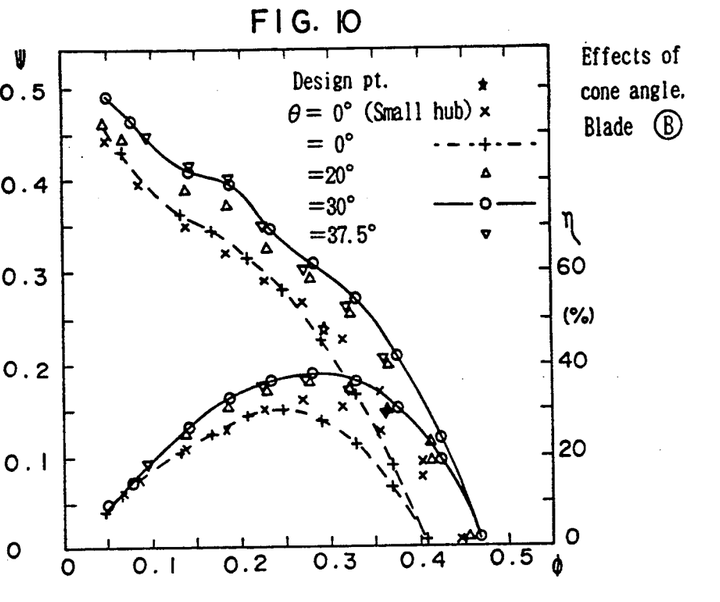
FIG. 10 shows a characteristic curve representing, experimentally, the relationship between the fan performance and the angle of slop of the boss of a second fan to be used in the present invention.
Figure 11:
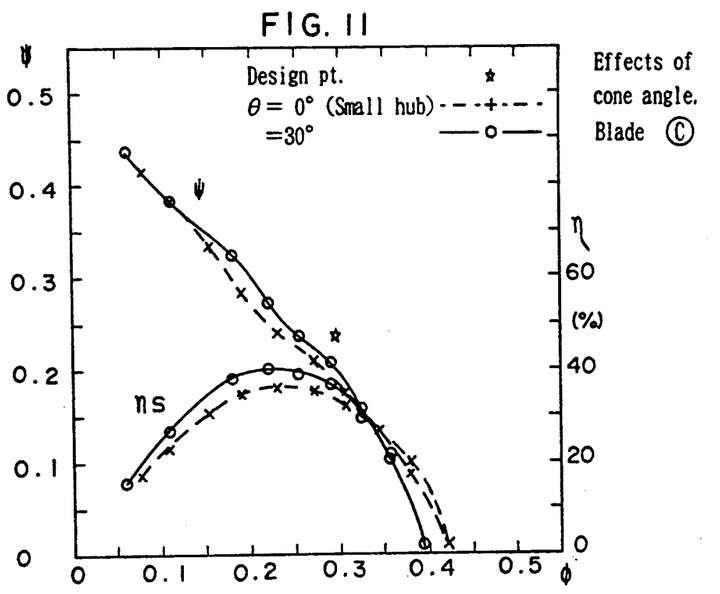
FIG. 11 shows a characteristic curve representing, experimentally the relationship between the fan performance and the angle of slope of the boss of a third fan to be used in the present invention.
Figure 12:
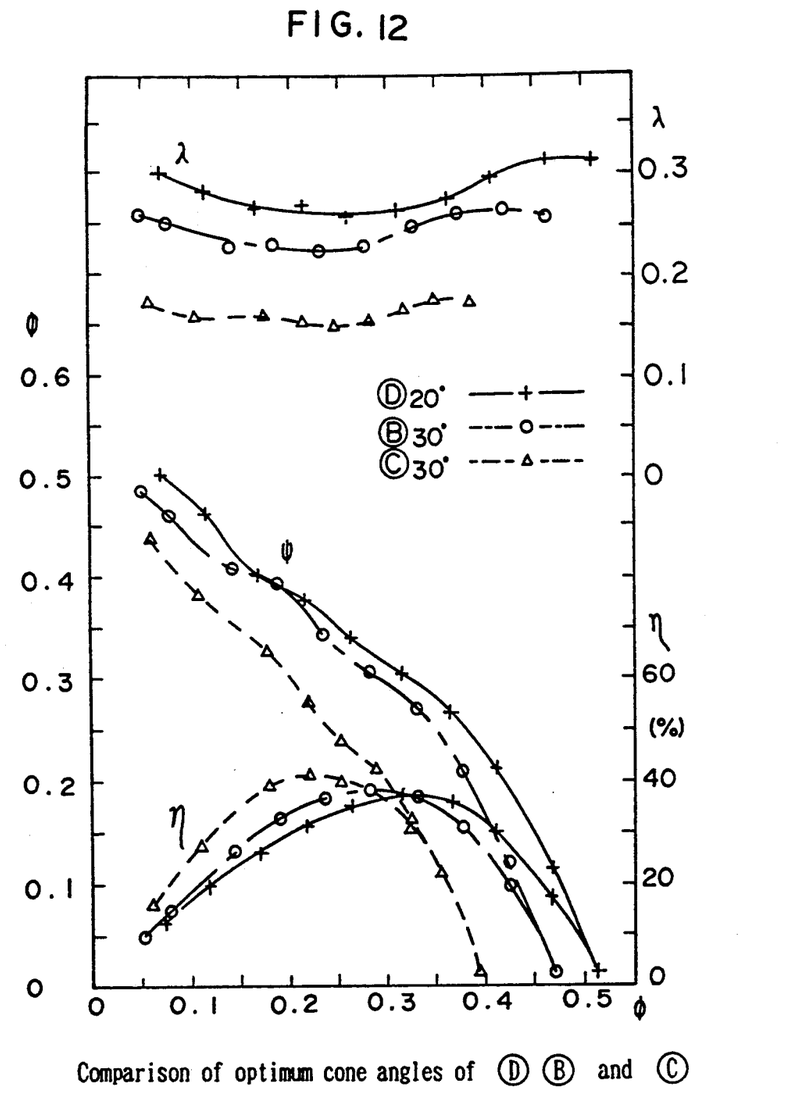
FIG. 12 shows a characteristic curve representing a comparison of performance among the first to third fan.

Characteristics—Characteristic curves of D, B and C for various cone angles are shown in FIGS. 9, 10 and 11. The optimum cone angles are 20° and 30° for D and B, respectively. Namely, the larger the blade width, the smaller the optimum angle is. The comparison of the optimum cone angle for D, B and C is shown in FIG. 12. The larger the blade width, the larger the flow rate and the static pressure are. Furthermore, the smaller the blade width, the larger the efficiency is. From FIGS. 9 to 11, it is clearly understood that the diagonal flow fan is superior to the axial flow fan in flow rate, static pressure, and efficiency. Also, FIG. 10 indicates that better perform is attained using smaller hub ratios.

Flow Visualization—Based on the dimensionless characteristic curves of λ, η, φ and φ, the values for the stall point and the maximum efficiency can be defined. With the flow visualization technique employed (Tufts), a variation in the flow direction for the maximum flow rate was observed near maximum efficiency and the stall point at the outlet of the blade.

What is claimed is:

1. A radiator/fan assembly for a cab-over-engine vehicle, said radiator/fan assembly comprising:
   a radiator disposed with a forward tilt and including a radiator core;
   an air cut duct, a central axis of which rises rearwardly, said air duct including one end with a first opening connected to an outer periphery of a back portion of said radiator core, an opposite end of said air duct including a second opening facing a front portion of an engine of said cab-over-engine vehicle; and
   a fan provided between said second opening of said air duct and said front portion of the engine for generating an air flow through said radiator core toward the engine,
   said fan including, at its center, a truncated, cone shaped boss and including a plurality of fan blades of equal length and fastened at their bases, respectively, to an outer periphery of said boss, a tip end of said fan blades, in a longitudinal direction, being parallel to a rotating shaft of said boss;
   said second opening including a short cylindrical part slightly separated from said tip end of each of said fan blades in a radial direction and parallel to said tip end of each of said fan blades in the longitudinal direction, said cylindrical part partially covering said fan blades in the longitudinal direction such that the trailing edges of said fan blades are exposed, wherein an angle defined by the outer periphery of said boss and a central axis of the rotating shaft thereof ranges from 20 to 35.5 degrees, and a relation between a radius (Ro) from said central axis of the rotating shaft to said tip end of said fan blade, and a radius (Rb) from said central axis of the rotating shaft to the outer periphery of said boss at a midpoint of said fan blade, as measured in the longitudinal direction, is expressed as follows:

$R_b/R_o = 0.45$ to $0.55$.

2. A radiator/fan assembly for cab-over-engine vehicles, as recited in claim 1, wherein an imaginary line (L) lies in a vertical plane extending in the longitudinal direction, said imaginary line (L) extending normal to the outer periphery of said boss from a root of the trailing edge of said fan blade to said tip end of said fan blade so as to define a distance (D) front a point (P) at the intersection of said imaginary line (L) and said tip end of said fan blade along said tip end of said fan blade to the trailing edge measured in the longitudinal direction, being expressed as follows:

$$D/T = 0.65 \text{ to } 1.0$$

where T is the width of said fan blade.

3. A radiator/fan assembly for cab-over-engine vehicle, as recited in claim 2, wherein said short cylindrical part of said air duct partially covers the width (T) of said fan blade, as measured in the longitudinal direction, by a length (S), the relation between (T) and (S) being expressed as follows:

$$S/T = 0.5 \text{ to } 0.7.$$

4. A radiator/fan assembly fan for cab-over-engine vehicles according to claim 3, wherein a pressure coefficient of said fan ranges from 0.25 to 0.35.

* * * * *